US006740841B2

(12) United States Patent
Brunet et al.

(10) Patent No.: US 6,740,841 B2
(45) Date of Patent: May 25, 2004

(54) PLASMA TORCH INCORPORATING ELECTRODES SEPARATED BY AN AIR GAP AND SQUIB INCORPORATING SUCH A TORCH

(75) Inventors: Luc Brunet, Bourges (FR); Jean Mary Lombard, Bourges (FR); Jean Francois Pierrot, Saint Doulchard (FR); Jean Luc Taillandier, Fussy (FR)

(73) Assignee: Giat Industries (FR)

( * ) Notice: Subject to any disclaimer, the term of this patent is extended or adjusted under 35 U.S.C. 154(b) by 265 days.

(21) Appl. No.: 09/958,573

(22) PCT Filed: Oct. 11, 2001

(86) PCT No.: PCT/FR01/00962

§ 371 (c)(1),
(2), (4) Date: Nov. 1, 2001

(87) PCT Pub. No.: WO01/78470

PCT Pub. Date: Oct. 18, 2001

(65) Prior Publication Data

US 2002/0134767 A1 Sep. 26, 2002

(30) Foreign Application Priority Data

Apr. 11, 2000 (FR) .......................................... 00 04735

(51) Int. Cl.[7] .............................................. B23K 9/00
(52) U.S. Cl. ........................... 219/121.52; 219/121.48; 219/121.36; 219/121.57; 102/202.5; 102/202.8

(58) Field of Search ........................ 219/121.36, 121.39, 219/121.43, 121.48, 121.52, 121.54, 121.57, 75; 102/8, 202.5, 202.6, 202.7, 202.8, 202.9, 202.11, 202

(56) References Cited

U.S. PATENT DOCUMENTS

| | | | | | |
|---|---|---|---|---|---|
| 4,035,684 | A | | 7/1977 | Svoboda et al. | |
| 5,012,719 | A | * | 5/1991 | Goldstein et al. | 89/8 |
| 5,164,568 | A | * | 11/1992 | Sanders | 219/121.52 |
| 5,675,115 | A | | 10/1997 | Hershkowitz et al. | |
| 5,945,623 | A | * | 8/1999 | Goldstein et al. | 89/8 |
| 6,121,569 | A | * | 9/2000 | Miley et al. | 219/121.48 |
| 6,508,199 | B1 | * | 1/2003 | Oyabu | 118/723 E |

FOREIGN PATENT DOCUMENTS

| | | |
|---|---|---|
| DE | 196 29 506 A1 | 1/1998 |
| DE | 196 29 508 A1 | 1/1998 |
| DE | 196 29 517 A1 | 1/1998 |
| GB | 1184427 | 3/1970 |

* cited by examiner

*Primary Examiner*—Mark Paschall
(74) *Attorney, Agent, or Firm*—Parkhurst & Wendel, L.L.P.

(57) ABSTRACT

A plasma torch including at least two electrodes separated by an insulating cylindrical case having a void, wherein the electrodes are separated by a distance (D) for forming an igniting arc therebetween when the electrodes are connected to a voltage, the distance (D) and the voltage being selected to form substantially a 1 Megavolt/meter electrical field between the electrodes, for forming an arc and causing plasma to be generated from the plasma generating material.

14 Claims, 3 Drawing Sheets

PLASMA TORCH INCORPORATING ELECTRODES SEPARATED BY AN AIR GAP AND SQUIB INCORPORATING SUCH A TORCH

FIELD OF THE INVENTION

The technical scope of the present invention is that of plasma torches and more particularly torches used to ignite the propellant charge of a piece of ammunition.

BACKGROUND OF THE INVENTION

A plasma torch is a system that enables high pressure (around 500 MPa) and high temperature (over 10000 K) gases to be generated by a high voltage (around 20 kV) electrical discharge made between two electrodes.

Plasma torches are used in industry, for example, to cut conductive materials, or else to destroy certain products or materials, or to carry out metallic deposits. They are also used in the field of armaments to generate pressure allowing a projectile to be fired.

Known plasma torches comprise an anode and a cathode separated by a capillary tube made of a material that is both electrically insulating and able to decompose in order to generate a plasma (for example a plastic material). The electrical discharge between anode and cathode is excited by means of a copper fuse or other conductive material. The electric arc thus created produces a plasma, which ablates the capillary tube wall, thereby causing the generation of light high-pressure high temperature gases.

These gases are used either to directly accelerate a projectile, or to vaporise a working fluid (for example, water) allowing the volume of the gas to be increased.

Patents FR2754969 and FR2768810, which describe plasma torches used to ignite the propellant charge of a piece of ammunition, may be consulted.

One drawback to known plasma torches lies in the fragility of the fuse wire allowing the plasma to be excited. Such a fuse wire has a diameter of 0.1 to 0.5 mm. It may break further to thermal and mechanical stresses (vibration, impacts) that occur during the storage and implementation phases of the ammunition elements.

Moreover, the manufacture of known torches is made difficult and costly by the operation to mount such a fuse.

BRIEF SUMMARY OF THE INVENTION

The aim of this invention is to overcome such drawbacks.

Thus the torch according to the invention has improved mechanical strength thereby increasing its reliability. Moreover, it is simple in structure and may be manufactured at low cost.

The torch according to the invention may be manufactured at different lengths without difficulty.

A further subject of the invention is an igniter squib implementing such a plasma torch, such squib facilitating the diffusion of the plasma towards the propellant charge and this for load configurations that are very different from the point of view of mass or geometry.

Thus, the invention relates to a plasma torch comprising at least two electrodes separated by an insulating cylindrical case delimiting an inner volume, said torch wherein the electrodes are separated by a sufficiently small distance for an igniting arc to appear between the electrodes when a serviceable voltage supplied by a generator is applied between them, the distance between the electrodes and the serviceable voltage of the generator being selected such that the electrical field appearing between the electrodes is of around 1 Megavolt/meter.

The torch may comprise a rear electrode and a front electrode, the rear electrode incorporating an axial tip oriented towards the front electrode and the front electrode incorporating a thinned crown oriented towards the rear electrode as well as an axial perforation.

The front electrode's axial perforation may be nozzle-shaped incorporating a convergent conical profile open at the rear electrode side and followed by a divergent conical profile open towards the outside of the torch.

According to a variant embodiment, the torch may incorporate a block of energetic material placed between the electrodes.

The block may be ring-shaped.

The torch will generally incorporate a metallic body having an axial bore inside which the electrodes and insulating case are placed.

The bore in the body may incorporate a shoulder onto which the front electrode is applied, the insulating cylindrical case being in axial support, firstly on the front electrode and secondly on the rear electrode, and insulating closing ring being screwed at a rear threading of the body ensuring the axial joining of the electrodes and insulating case with the body.

The closing ring may incorporate a lip surrounding a thinned extension to the insulating case.

The front electrode may incorporate a cylindrical seat onto which the insulating case will be fitted.

The torch may incorporate a spacer ring coaxial to the insulating case and placed between the front electrode and the energetic block, the latter pressing on a countersink made in the insulating case.

A further subject of the invention is an ammunition squib wherein it comprises such a plasma torch.

The squib may comprise a tubular nozzle perforated by at least one hole and integral with the torch at its front part so as to receive the plasma generated by the torch.

The nozzle may incorporate at least two holes evenly spaced angularly and/or axially and perforated according to the radial directions of the nozzle.

BRIEF DESCRIPTION OF THE DRAWINGS

Other advantages of the invention will become apparent after reading the following description of the different embodiments, such description being made with reference to the appended drawings, in which.

DETAILED DESCRIPTION OF THE INVENTION

Figure 1:
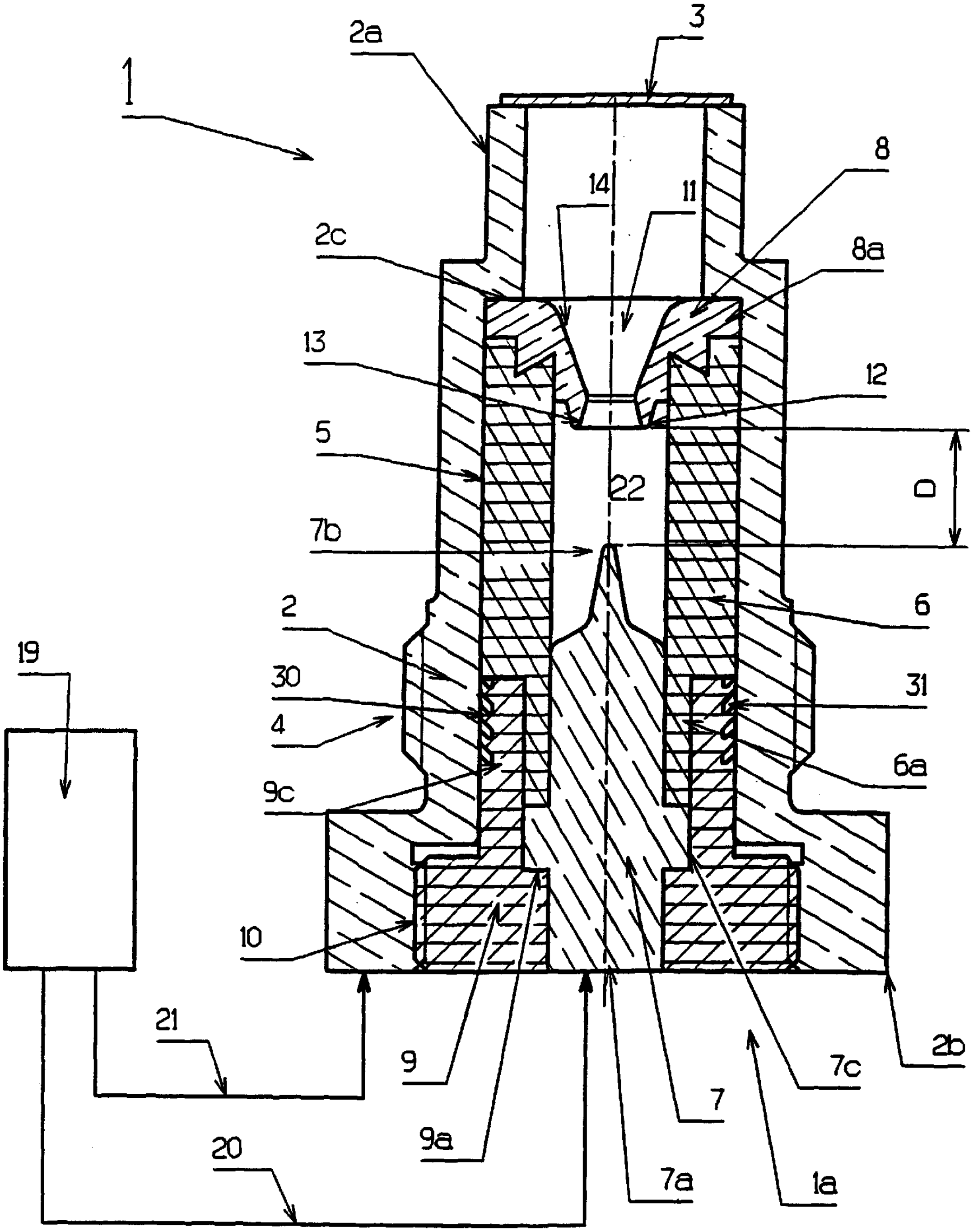
FIG. 1 shows a longitudinal section of a first embodiment of a torch according to the invention.

With reference to FIG. 1, a plasma torch 1 according to a first embodiment of the invention comprises a tubular metallic body 2, obturated at a front part 2*a* by a thin lid 3 made of a plastic or metal material and bonded to the body 2.

The rear part 2*b* of the body 2 has an enlarged diameter so as to constitute an abutted collar making it easier to fasten the torch in a bore of a support (not shown), for example a munition base. Also in order to allow the torch 1 to be attached, the body 2 has threading 4.

The tubular body 2 will be covered over substantially all its outer surface by an insulating material (not shown), for example by the deposit under vacuum of 30 to 80 micrometers of a plastic material such as polyurethane or another insulating material, such as glass or ceramic. Such an arrangement improves the electrical insulation of the torch. Plastic material will not, however, be deposited on the threading so as not to hinder the attachment of the body.

The body 2 has an axial bore 5 inside which a cylindrical insulating case 6 is placed made of a plastic material able to ablate, that is to say able to generate light gases through the action of a plasma. The case 6 may, for example, be made of polyoxymethylene or polytetrafluorethylene. The case 6 may also be made of an energetic material, for example nitrocellulose.

Such a case is generally called a capillary tube in known plasma torches.

Two metallic electrodes 7 and 8 (made, for example, of a copper alloy) are separated by the insulating case 6.

A rear electrode 7, globally cylindrical and of the same axis as the body 2, extends inside the case 6.

It has a rear end 7*a* that is flush with the rear face of the torch. Its front end 7*b* forms a tip forming a foot for the electric arc that will generate the plasma.

A ring-shaped front electrode 8 is applied against an internal countersink 2*c* in the case 2. It has a peripheral shoulder 8*a* that is fitted tightly to the body 2. The front electrode 8 incorporates an axial perforation 11 and also has a thinned crown 12 that is oriented towards the tip 7*b* of the rear electrode 7.

According to the invention the front electrode 8 and rear electrode 7 are axially separated by a distance D (or air gap) that is selected such that (for the electrical voltage selected) the electrical field between the electrodes is around 1 Megavolt/m. By way of an example, for a voltage between electrodes of 10 000 Volts, the distance D will be 10 mm. This reduced spacing between the electrodes as well as the pointed shapes 7*b* and 12 of the two electrodes promote the formation of an electrical arc in the air gap separating the electrodes.

It is therefore unnecessary to provide a priming fuse wire connecting the electrodes. The mechanical strength and reliability of the torch according to the invention is thus much greater than that of known torches since there is no risk of a fuse breaking.

The axial perforation 11 of the front electrode 8 also has a nozzle-shaped profile incorporating a convergent conical profile 13 open on the rear electrode 7 side and succeeded by a divergent conical profiles 14 open towards the exterior of the torch 1.

The convergent and divergent angles of the nozzle will be easily determined by the expert according to the performances required for the torch (required velocity and pressure for the plasma exiting the nozzle).

The convergent angle 13 is of around 15° and the divergent angle 14 around 20° (half angles at the vertex of the cones).

The total length of the nozzle will be of around 15 mm.

The nozzle allows a reduction in heat loss from the plasma generated by the torch. Indeed, the nozzle allows the gases located at the periphery to be brought back into the axis of the torch. These gases are thus heated by the plasma.

The rear electrode 7 also has a peripheral shoulder 7*c* that acts as a positioning abutment for the rear electrode 7 with respect to the body 2. The shoulder 7*c* presses against a countersink 9*a* of an insulating closing ring 9 that has threading 10 allowing it to be screwed onto a rear screw cutting in the body 2.

The ring 9 is made of an insulating material with high mechanical strength, for example polyoxymethylene. The ring 9 incorporates a tubular front part 9*c* that is fitted in a bore 5 in the body 2. This front part forms a sealing lip providing, via its radial deformation when the torch operates, sealing for the gases produced by the torch 1.

The cylindrical insulating case 6 presses axially on the shoulder 8*a* of the front electrode and on the rear electrode 7. The case incorporates a thinned extension 6*a* that is sandwiched between a cylindrical seat of the electrode 7 and the tubular front part 9*c* of the ring 9.

This front part incorporates ring-shaped sealing lips 30 separated by ring-shaped grooves 31. Through their radial deformation, the lips 30 provide sealing for the gases produced by the torch 1 during its operation. The grooves 31 form expansion chambers also improving gas-tightness.

Thus, screwing the ring 9 on ensures the axial joining of the electrodes 7, 8 and the insulating case 6 to the body 2.

This torch operates as follows.

An electric generator 19 is connected by electric connections 20, 21 to the torch 1. A first connection 20 is in electrical contact by appropriate means (for example a spring needle, not shown) with the rear electrode 7. A second connection 21 is in electrical contact with the metallic body 2 of the torch, for example by a spring needle pressing on the rear part 2*b* of it.

The body 2 is in electrical contact with the front electrode 8 thanks to the tight fit of the shoulder 8*a* of the electrode in the bore 5 in the body 2.

The generator 19 is designed to deliver power of around 1 million Joules at a voltage of around 20 kilo Volts. Such an arrangement ensures the presence of an electrical field between the electrodes of 1 Megavolt/meter thereby igniting the plasma without needing a fuse. Such a generator is conventional and comprises capacitors, an inductor, thyristors and a stabilised power supply.

This voltage is applied to electrodes 7 and 8. Because of the pointed shape of the electrode ends and the reduced air gap separating them, an electrical arc is produced between the electrodes 7 and 8. The arc is confined in the chamber 22 delimited by the insulating case 6 and the electrodes 7 and 8. The substantial pressure (around 100 Mega Pascal) present in this chamber will cause the case 6 material to ablate and a plasma to be created that will flow out of the body 2 through the nozzle 11. The thin lid 3 will be broken as soon as the torch is ignited.

This plasma allows, for example, the propellant charge of a piece of ammunition to be ignited. It ensures the advantages commonly associated with ignition by electrical plasma: higher pressure level than that of a conventional pyrotechnic ignition due to the supply of electrical energy by the generator. This results in a higher velocity for the projectile. The plasma may also by use for a civil application, such as cutting or destruction of material, the creation of safety openings, etc.

The nozzle 11 assists the axial flow of the plasma gases out of the torch 1 and accelerates these gases.

The pressure level in the chamber 22 is thus limited to an acceptable value for the mechanical strength of the torch whilst accelerating the diffusion of the plasma thereby improving ignition performance for the propellant charge of a piece of ammunition.

It is thus possible using the torch according to the invention to obtain a plasma velocity of around 10 000 m/s.

The electrical energy being consumed is of around 1 Mega Joule for an air gap D between the electrodes of around 20 mm, and a voltage of 20 Kilo Volts.

The torch according to the invention has thus an excellent bulk/performance ratio, while being of a simple design that is easy to manufacture.

Figure 2:
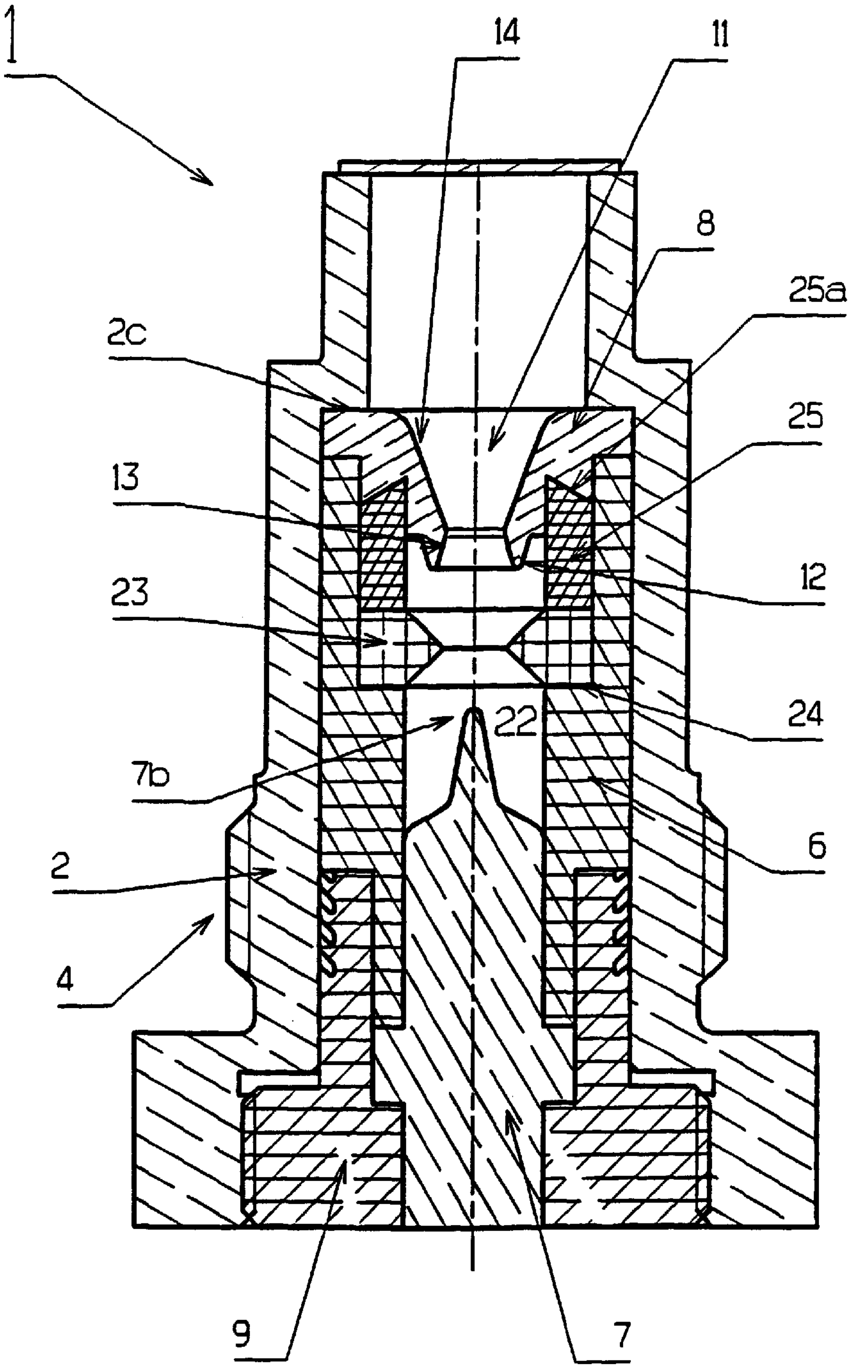
FIG. 2 shows a longitudinal section of a second embodiment of a torch according to the invention.

FIG. 2 shows a second embodiment of a plasma torch according to the invention.

This embodiment differs from the previous one in that a block 23 of energetic material is placed between electrodes 7 and 8.

The block is made by the hot or cold compression of an energetic material such as nitrocellulose or a pyrotechnic composition. The following classical compositions may be used by way of a pyrotechnic composition: Boron/potassium nitrate (B/KNO3), Aluminium/potassium perchlorate (Al/KC104), Aluminium/copper oxide (Al/CuO).

The block 23 presses on a countersink 24 made in the insulating case 6. A spacer ring 25 is placed coaxially to the insulating case 6 and it is placed between the front electrode 8 and the block 23.

Thus, the block 23 is positioned rigidly between the two electrodes.

Its ring shape avoids hindering the formation of the discharge arc between the electrodes.

According to the embodiment shown in FIG. 2, the block 23 has a bore delimited by symmetrical conical profiles forming a convergent followed by a divergent. Such as arrangement facilitates the ablation and/or combustion of the material of the block 23.

When such a torch operates, the pressure and temperature established in the chamber 23 ensures the ignition of the block 23. This combustion allows the plasma pressure level to be increased.

The spacer ring 25 will preferably be made of the same material as the case 6. It will thus ablate similarly to the case and will take part in the formation of the plasma.

The spacer ring 25 shown in FIG. 2 incorporates one conically bevelled end 25*a* that penetrates in a housing of matching shape made in the electrode 8. Such an arrangement improves gas-tightness and prevents gases from passing between the spacer 25 and the electrode 8.

The plasma torch shown in FIGS. 1 and 2 may be directly installed onto an ammunition base. Such an embodiment is more particularly adapted to the ignition of small or medium calibre munitions (less than 50 mm).

Figure 3:
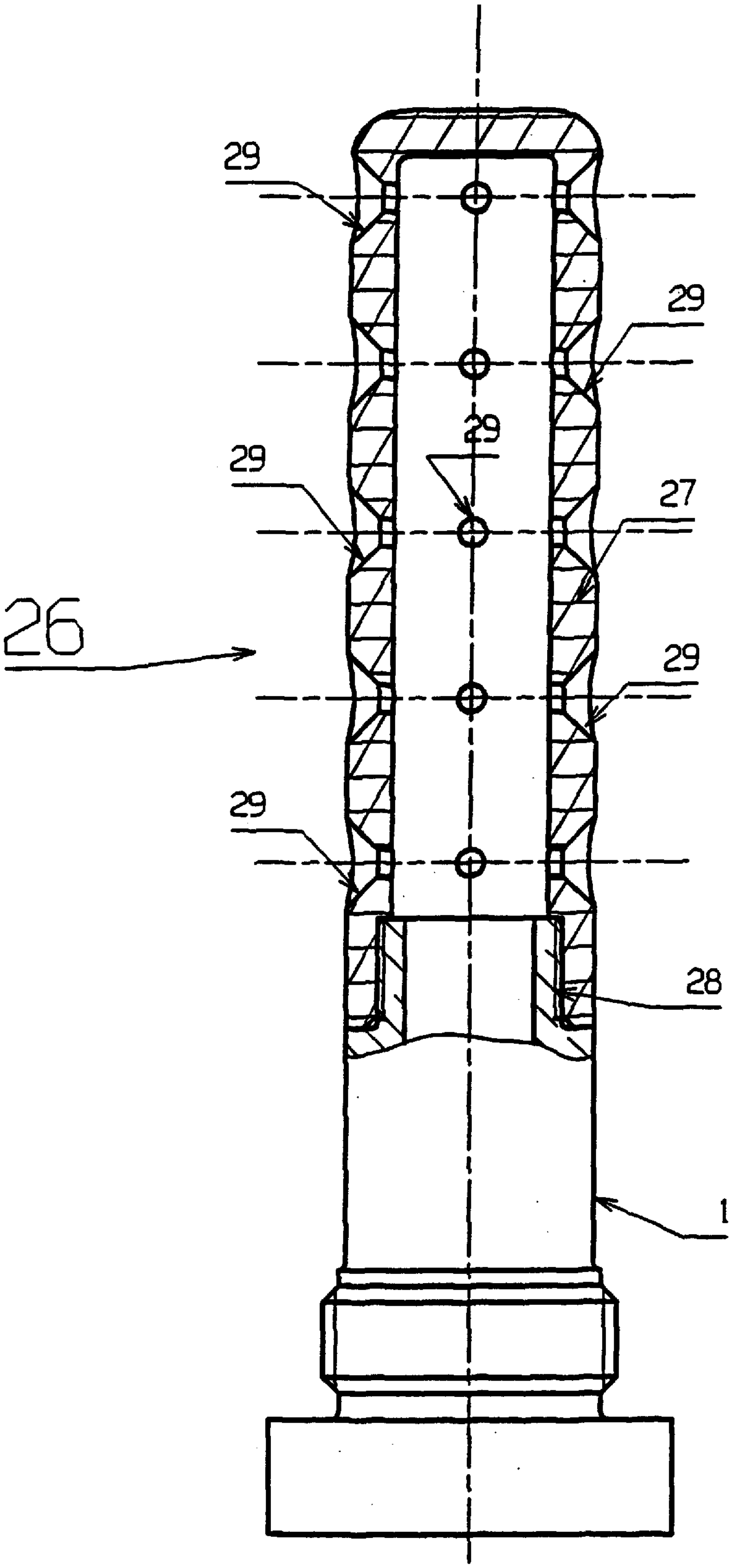
FIG. 3 shows a longitudinal section of a squib implementing a torch according to the invention.

FIG. 3 shows a squib 26 according to one embodiment of the invention.

This squib incorporates a torch 1 according to one or other embodiment described previously, said torch not being shown here in detail.

This squib comprises a tubular nozzle 27 attached by bonding or screwing to a cylindrical extension 28 of the torch 1.

The nozzle is made of a plastic material able to be ablated by the plasma (such as polyoxymethylene) or else a combustible material, for example nitrocellulose. It is perforated with holes 29 evenly spaced angularly and axially and perforated according to radial direction of the nozzle.

The holes 29 have a conical profile that flares towards the outside of the body 2 to facilitate the evacuation of the plasma gases.

The nozzle receives the plasma generated by the torch 1 and diffuses it in radial directions.

Such an embodiment is more particularly adapted to igniting munitions of a calibre over 50 mm.

For a given torch 2 dimension, the length of the nozzle 27 may vary between 20 and 300 mm without any significant loss of performance.

By way of a variant, an energetic material may be placed inside the nozzle 27 that allows the pressure or the energy of the plasmas to be improved. For example, a pyrotechnic composition, a propellant powder or a propellant. An axial channel may be provided in this energetic material.

By way of a variant, an axial hole may be provided at the end of the nozzle 27.

It is naturally possible for one or other of the torches shown in FIG. 1 or 2 to be associated with the squib shown in FIG. 3.

What is claimed is:

1. A plasma torch comprising:

an insulating cylindrical case having a void therein;

at least one plasma generating material located in the cylindrical case;

at least two electrodes separated by the insulating cylindrical case, wherein the electrodes are separated by a distance (D) for forming an igniting arc therebetween when said electrodes are connected to a voltage source, the distance (D) and a voltage of the voltage source being selected to form substantially a 1 Megavolt/meter electrical field between the electrodes, for forming an arc and causing plasma to be generated from the plasma generating material.

2. The plasma torch according to claim 1, further comprising:

a rear electrode having a rear electrode side and a front electrode, the rear electrode comprising tip aligned along the axis of the cylindrical case and oriented toward the front electrode, the front electrode comprising a crown having first and second openings with centers on the axis of the cylindrical case and a perforation between the openings aligned and oriented toward the rear electrode.

3. The plasma torch according to claim 2, wherein the crown is nozzle-shaped and comprises a convergent conical profile open at the rear electrode side and connected to a divergent conical profile open toward an area outside the torch.

4. The plasma torch according to claim 1, further comprising a portion of energetic material located between the electrodes, said energetic material for producing energy when burned.

5. The plasma torch according to claim 4, wherein the portion is ring-shaped.

6. The plasma torch according to claim 1, further comprising a metallic body comprising an axial bore wherein the electrodes and insulating case are located.

7. The plasma torch according to claim 6, further comprising:

a front electrode and a rear electrode;

an insulating closing ring, wherein:

the bore in the body includes a shoulder on which the front electrode is located, the insulating cylindrical case supports the front electrode and the rear electrode in alignment with the axis of the cylindrical case, and the insulating closing ring is threadedly attached to the body to ensure joining of the electrodes and the insulating case with the body along the axis of the cylindrical case.

8. The plasma torch according to claim 7, wherein said insulating case comprises a thinned extension and the closing ring comprises a lip surrounding the thinned extension of the insulating case.

9. The plasma torch according to claim 7, wherein the front electrode comprises a first annular seat against which the insulating case is located.

10. The plasma torch according to claim 9, wherein the insulating case comprises a second annular seat, and the torch further comprises a spacer ring coaxial with the axis of the insulating case and located between the front electrode and the energetic portion, the energetic portion against the second annular seat.

11. The plasma torch according to claim 1, in combination with a squib for a piece of ammunition.

12. The combination according to claim 11, wherein the squib further comprises a tubular nozzle perforated by at least one first hole and is integral with the torch at a front part thereof for receiving plasma generated by the torch.

13. The combination according to claim 12, wherein the nozzle comprises at least two second holes radially perforating and spaced angularly around the nozzle.

14. The combination according to claim 12, wherein the nozzle comprises at least two second holes radially perforating and evenly spaced angularly around the nozzle.

* * * * *

UNITED STATES PATENT AND TRADEMARK OFFICE

CERTIFICATE OF CORRECTION

PATENT NO. : 6,740,841 B2
DATED : May 25, 2004
INVENTOR(S) : Luc Brunet

It is certified that error appears in the above-identified patent and that said Letters Patent is hereby corrected as shown below:

Title page,
Item [22], PCT Filed:, change "October 11, 2001" to -- March 30, 2001 --.

Signed and Sealed this

Twenty-seventh Day of July, 2004

JON W. DUDAS
*Acting Director of the United States Patent and Trademark Office*